United States Patent [19]

Gagliani et al.

[11] 4,444,823

[45] Apr. 24, 1984

[54] FIBER REINFORCED COMPOSITE ARTICLE USING MODIFIED POLYIMIDE ADHESIVE

[76] Inventors: John Gagliani, 6280 Lance Pl., San Diego, Calif. 92120; John V. Long, 1756 Lexington Pl., El Cajon, Calif. 92021

[21] Appl. No.: 492,560

[22] Filed: Jun. 10, 1983

Related U.S. Application Data

[62] Division of Ser. No. 423,801, Sep. 27, 1982.

[51] Int. Cl.³ .................................................. B32B 5/12
[52] U.S. Cl. .................................... 428/113; 264/136; 264/137; 264/258; 428/246; 428/251; 428/252; 428/284; 428/473.5
[58] Field of Search ..................... 428/902, 473.5, 246, 428/251, 252, 284, 113; 427/385.5, 389.8, 243; 264/136, 137, 258

[56] References Cited

U.S. PATENT DOCUMENTS

| | | | |
|---|---|---|---|
| 4,161,477 | 7/1979 | Long et al. | 528/322 |
| 4,183,838 | 1/1980 | Gagliani | 528/322 |
| 4,183,839 | 1/1980 | Gagliani | 528/322 |

*Primary Examiner*—George F. Lesmes
*Assistant Examiner*—P. R. Schwartz
*Attorney, Agent, or Firm*—Frank D. Gilliam

[57] ABSTRACT

Modified polyimide adhesives useful for high efficiency bonding at moderate temperatures. Basically, the adhesives are prepared by reacting suitable quantities of an oxime, an aromatic tetracarboxylic acid dianhydride and an aliphatic tetracarboxylic acid dianhydride, esterifying the resulting bisimide with a reactive solvent esterifying agent and mixing therewith a suitable diamine. This copolyimide adhesive may be dried to a selected viscosity before or after coating onto one or both surfaces to be bonded together. When the surfaces are pressed together under moderate pressure and heated for a suitable period at a temperature in the range of about 230° to 320° C. an excellent, flexible bond is obtained, having high peel strength and excellent resistance to high temperatures.

8 Claims, No Drawings

FIBER REINFORCED COMPOSITE ARTICLE USING MODIFIED POLYIMIDE ADHESIVE

This is a division, of application Ser. No. 423,801, filed Sept. 27, 1982.

BACKGROUND OF THE INVENTION

This invention relates in general to polyimide resins and, more specifically, to modified polyimide resins suitable for use as high performance adhesives.

Prior U.S. Pat. Nos. 4,161,477, 4,183,838 and 4,183,839 (to John Gagliani, one of the coinventors of this application) disclosed and claimed certain polyimide compositions which are flame resistant and useful as coatings and adhesives.

The coating and adhesive compositions described in the above-mentioned prior patents are made by first preparing a suitable bisimide by reacting an aromatic tetracarboxylic acid dianhydride with a cyclic amide or oxime. The ratio of oxime to dianhydride is preferably in the 2.3:1 ato 2.7:1 range and the imidization reaction is preferably conducted at a temperature of 170°–200° C. for 20–60 minutes.

The polyimide forming material is then prepared by dissolving the bisimide in an inert solvent; then adding thereto a suitable diamine, producing a viscous fluid containing an intimate, unpolymerized mixture of N-substituted cyclic bisimide dicarboxylic acid and diamine which is capable of being converted to a high molecular weight polymer through an exchange reaction by the application of heat.

The solution is coated onto a surface and polymerized by heating to a temperature in the 177°–316° C. range for 30 minutes to 5 hours. In order to keep the cure period reasonably short, it was necessary to perform a final cure for at least about 30 min. at about 316° C. The following is exemplary of the exchange reaction which occurs:

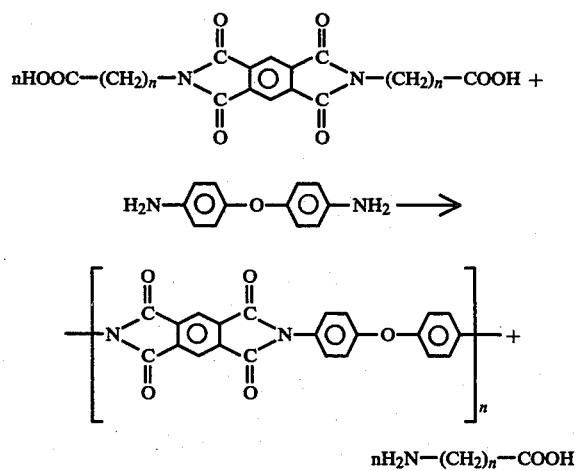

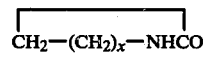

where n is a positive integer.

The resulting coating is tough, highly adherent to various surfaces, with very few pinholes or bubbles. It has excellent peel strength and is resistant to high temperatures, peeling and abrasion.

The prior coating material, however, was not fully satisfactory for many applications. Curing tended to require either excessively high temperatures, in the 300° C. area, or very long curing periods at somewhat lower temperatures. The final adhesive layer tended to be somewhat more rigid and brittle then desired, lacking the ideal adhesive elasticity and flexibility.

Thus, there is a continuing need for improved polyimide adhesives having a better combination of low processing temperatures, durable, flexible bonds and resistance to high ambient temperature after curing.

SUMMARY OF THE INVENTION

By making certain changes in the compositions and methods described in the above-referenced prior Gagliani patents, we have found that a polyimide adhesive can be made which overcomes the problems noted above.

Our improved adhesive is made, basically, by the steps of reacting a suitable aromatic dianhydride with a suitable oxime to produce a monoimide, dissolving the reaction product in a reactive solvent esterifying agent, adding a suitable aliphatic dianhydride to the solution either before or after the addition of the solvent, adding a suitable diamine and any desired additives, coating the resulting liquid onto at least the first of two surfaces to be bonded, bringing the second surface to be bonded into pressure contact with the coating and curing the adhesive at a temperature of from about 230° to 320° C. for about 5 to 120 minutes to produce an imide copolymer.

A tough but flexible and elastic bond between the two surfaces results, with shear strength values in the range of 3000 psi.

DETAILED DESCRIPTION OF THE INVENTION

Any suitable aromatic and aliphatic dianhydrides may be used in the preparation of the desired copolymers. Typical dianyhdrides include those described in U.S. Pat. Nos. 3,282,897, issued Nov. 1, 1966 and 3,310,506, issued Mar. 21, 1967 and those included in the above-cited patents to John Gagliani. Due to their ready availability at reasonable prices and the excellent adhesives which result, the preferred aromatic dianhydrides are pyromellitic dianhydride and 3,3′,4,4′-benzophenone tetracarboxylic acid dianhydride (BTDA) and the preferred aliphatic dianhydride is 1,2,3,4-butanetetracarboxylic acid dianhydride (BTCD).

Any suitablee oxime may be reacted with the selected dianhydride to produce the desired imide. Preferably, the oxime has the general formula:

$$\overline{CH_2-(CH_2)_x-NHCO}$$

where "x" is a positive integer from 2 to 4. Of these, best results are obtained with caprolactam.

While any suitable reaction conditions may be used, we have obtained excellent results where the aromatic dianhydride is added to the oxime, the mixture is heated to about 150° to 200° C. until the condensation reaction is complete, about 5 to 90 minutes, then the esterifying solvent is added, followed by addition of the aliphatic dianhydride. In another preferred arrangement, the aromatic dianhydride, aliphatic dianhydride, oxime and the esterifying solvent are mixed together in any order, then heated to reflux temperature to permit completion of the condensation and esterification reactions.

For best results, the molar ratio of oxoimine to aromatic dianhydride should be in the 0.1:1 to 1:1 range and the molar ratio of oxime to aliphatic dianhydride should be in the 0.1:1 to 1:1 range. Optimum adhesives are produced where the molar ratio of oxime, to the sum of the moles of aromatic dianhydride and aliphatic dianhydride is about 1:1. At this ratio, the resin exhibits shear strength values of 3000 psi and above when used to bond titanium to titanium.

Any suitable reactive solvent which acts as an esterifying agent may be used. Typical of these are aliphatic alcohols having up to 6 carbon atoms and aromatic alcohols, which may have halogen or amino substitutions, and mixtures thereof. Best results have been obtained with methyl alcohol.

The esterification may take place under any suitable conditions. Typically, a mole ratio of imide to esterifying agent of from about 1:8 ato 1:15 is preferred to assure rapid esterification at reflux temperature. Preferably, a small quantity (e.g. about 10 wt. % of the weight of the esterfying agent) of water is added to speed the esterfication of the aliphatic diamine.

Once the esterification is complete, the selected diamine or diamines are added to the solution. Preferably, an approximately stoichiometric quantity of diamine is used.

Any suitable diamine may be used. Typical diamines include methylene dianiline, meta-phenylene diamine, paraphenylene diamine; 4,4'-diaminodiphenyl sulfone, 3,3'-diaminodiphenyl sulfone, 4,4'-diaminodiphenyl oxide, 2,4 diaminotoluene, 3,3' diaminodiphenyl methane and mixtures thereof. Of these, best results are obtained with methylene dianiline and 4,4'-diaminodiphenyl oxide which are, therefore, preferred. If desired, aliphatic diamines may be used in combination with these aromatic diamines. Typical aliphatic diamines include 1,3 diamino propane, 1,4 diamino butane, 1,6-diamino hexane, 1,8-diamino octane, 1,12 diamino dodecane and mixtures thereof.

Additives to improve various characteristics of the final adhesive may be added as desired. Any appropriate additives may be used, such as fillers, and surfactants. Typical surfactants include Dow Corning Corp. 190 or 193, FC430 from Minnesota Mining & Manufacturing Co., Zonyl FSC from E. I duPont de Nemours & Co., and L550 from Union Carbide Corp. While any suitable concentration may be used, from about 0.01 to 2% by weight, based on the weight of the solution prior to drying) is preferred. Of these surfactants, best results have been obtained with Zonyl FSC. Fillers and reinforcing additives may be added. Typical fillers include Kevlar aramid fibers, graphite fibers, glass fibers, carbon and graphite powders, Teflon fluorocarbon powders, metal powders and mixtures thereof.

Macroballoons having diameters of about 0.1 to 10 mm may be mixed into the adhesive in any desired quantity. Small quantities thicken the adhesive, while relatively large quantities result in castable material suitable for the manufacture of light weight, strong, flame resistant shapes. Typical macroballoon compositions include ceramics, metals and synthetic resins.

The solution may be partially dried prior to application to the surfaces to be bonded, if desired. Or, the solution may be coated onto one or both of the surfaces to be bonded, then partially dried to a tacky state to remove the solvents prior to bringing the surfaces together and during the resin.

This adhesive may be used to bond any suitable surfaces by any suitable method. Strong adhesive bonds are formed, for example, between aluminum/aluminum, steel/steel, titanium/titanium and any combination thereof. Glass and many ceramics may also be adhesively bonded. Any suitable coating technique may be used to apply the adhesive, such as spray, roller or brush coating.

The polymerization reaction which produces the strong bond is not fully understood. It appears to be a combined condensation and exchange reaction which produces a terpolyimide system. The adhesive is cured by heat under pressure. Preferably, a pressure of about 2 to 5 psig is applied during at least the early stages of cure. Temperatures of from about 230° to 320° C. may be used over periods of about 30 to 240 minutes. Best results are obtained with an initial cure under pressure of about 5 psig for about 60 minutes at about 230° C., followed by removal of pressure and a 180 minutes post-cure at about 230° C.

The adhesive may also be used to impregnate woven or matted high strength fiber fabrics, such as glass, graphite, aramid or boron fiber fabrics. The fabrics are preferably first impregnated with the adhesive solution, which is dryed sufficiently to drive off residual solvent. The tacky fabric sheets are then stacked in a desired arrangement and shape, a pressure of about 20 to 100 psig is applied and the sheets are heated to about 230° and 320° C. for about 30 to 120 minutes to cure the polyimide resin. A well-consolidated composite structure results.

Details of the invention will be further understood upon reference to the following examples, which describe preferred embodiments of the methods and compositions of this invention. All parts and percentages are by weight, unless otherwise indicated.

EXAMPLE I

About 241.6 g. (0.75 M) of 3,3', 4,4'-benzophenonetetracarboxylic acid dianhydride and about 84.8 g. (0.75 M) caprolactam are placed in a 3 liter flask, heated to about 175° C. and maintained at that temperature for about 30 min. The mixture is cooled to about 70° C. and about 450 g. of methanol and about 40 g. water are added. About 148 g. 1,2,3,4-butanetetracarboxylic acid dianhydride (0.75 M) is added to the mixture and the mixture is refluxed, at about 65° C., until clear (about 60 min.). The mixture is then cooled to just below about 55° C. and about 297 g. of 4,4'-diaminodiphenyl methane (1.5 M) is added. The mixture is heated at about 60° C. for about 15 min. About 8.0 g. of Zonyl FSC fluorocarbon surfactant is added and the mixture is mixed for about 15 min. The liquid resin at this stage has about 66% solid content. The liquid resin is brushed on one surface of each of two aluminum plates and is dried in an air circulating oven at about 93° C. for about one hour. The coated surfaces are then brought together in a press and pressed at about 34.7 KPa (5 psig). The temperature is increased to about 232° C. and held for about one hour. The plates are found to be very securely bonded together. The lap shear strength value of the aluminum to aluminum bond is about $24.12 \times 10^6$ N/m$^2$ (3500 psi).

EXAMPLE II

The procedures of Examples I are repeated except that the plates being bonded are: II(a) titanium to titanium, II(b) steel to steel, II(c) steel to aluminum and II(d) glass to glass. In each case an excellent bond is achieved, with shear strength values exceeding 3000 psi.

EXAMPLE III

The procedure of Example I is repeated with four additional samples, varying only the quantity of caprolactam. Where Example I used 84.8 g. (0.75 M) caprolactam, to give a molar ratio of caprolactam to BDTA of about 1:1, the four additional tests use caprolactam quantities of about: III(a) 21.2 g. (0.19 M, 0.25:1 ratio), III(b) 42.4 g. (0.375 M, 0.5:1 ratio), III(c) 127.2 g. (1.125 M, 1.25:1 ratio) and III(d) 169.6 g. (1.5 M, 2:1 ratio). The characteristics of the adhesive products in these tests are excellent overall for tests III(a) and III(b). The adhesives of III(c) and III(d) have high flexibility, but poorer high temperature resistance. This demonstrates that for best results the ratio of oxime to aromatic dianhydride should be in the ratios between about 0.5:1 and 1.25:1.

EXAMPLE IV

The procedures of Example I are repeated, except that in place of ethanol, the following solvents are used: IV(a) isopropyl alcohol, IV(b) aminoethyl alcohol, IV(c) benzene, IV(d) dimethyl acetamide and IV(e) acetone. In each case IV(a) and IV(b) where a reactive solvent is used to esterify the imide, an excellent adhesive results. Where an inert solvent is used, in IV(c) through IV(e), the adhesive is poor.

EXAMPLE V

The procedures of Example I are repeated, except that the following diamines are used in place of the 4,4'-diaminodiphenyl methane: V(a) m-phenylenediamine (1.5 M), V(b) 4,4'-diaminodiphenyl sulfone (1.5 M), V(c) p-phenylene diamine (1.5 M), V(d) 4,4'-diaminodiphenyl oxide (0.75 M) and 4,4'-diaminodiphenyl sulfide (0.75 M). In each case the adhesive has excellent bonding characteristics, with some variation in properties among the sub-examples.

EXAMPLE VI

The procedures of Example I are repeated with the only change being the substitution of the following oximes for the 0.75 M caprolactam specified in Example I: VI(a) 2-pyrrolidone (0.75 M), VI(b) 2-piperidone (0.75 M), VI(c) caprolactam (0.375 M) and 2-piperidone (0.375 M). The product in each case is an excellent adhesive, with slight changes in physical properties with the different oximes.

EXAMPLE VII

The procedures of Example I are repeated with three additional samples, changing only the surfactant used. Where Example I used 8.0 g. of Zonyl FSC flurocarbon surfactant, these examples use: VII(a) no surfactant, VII(b) about 6.0 g. Dow Corning 190 silicone surfactant, VII(c) about 9.0 g. FC430. With no surfactant, Ex. VII(a), the adhesive is difficult to dry by removal of the solvents. The surfactants of VII(b) and VII(c) both give good results.

EXAMPLE VIII

A liquid adhesive is prepared as described in Example I. The following agents are added to about 80 g. samples of the liquid adhesive: VIII(a) about 50 g. glass microballoons having diameters of about 0.1 mm. and about 110 g. ethyl alcohol, VIII(b) about 40 g. polyimide macroballoons prepared as described in our copending U.S. patent application Ser. No. 423,802, filed Sept. 27, 1982 and about 100 g. ethyl alcohol, VIII(c) about 60 g. finely divide aluminum powder and about 100 g. ethyl alcohol. Each of these samples is mixed and poured into an open mold. The solvent is evaporated by heating at about 93° C. for about one hour, then the resin is cured at about 235° C. for about one hour. The samples of Ex. VIII(a) and VIII(b) consolidate into syntactic foams having densities of about 240 Kg./m.$^3$ and 65.6 Kg./m$^3$, with the macroballoons well bonded together. The sample of Ex. VIII(c) consolidates into a solid, dense block. All three are strong and flame resistant.

EXAMPLE IX

About 241.6 g. (0.75 M) 3,3',4,4'-benzophenonetetracarboxylic acid dianhydride (BTDA), about 84.8 g. (0.75 M) caprolactam and about 148.6 g. (0.75 M), 1,2,3,4-butanetetracarboxylic acid dianhydride (BTCD) are placed in a three liter flask to which about 450 g. of methanol is then added. The mixture is heated to reflux (about 65° C.) and refluxed until clear (about 60 min.). Then about 297.0 g. (1.5 M) 4,4'-diaminodiphenyl methane and about 8 g. Zonyl FSC surfactant are added and mixed. The mixture is heated at about 65° C. for about 10 minutes to dissolve the diamine, then the mixture is coated onto two aluminum plate surfaces and further dried for about 30 min. at about 90° C. The plates are brought together under a pressure of about 4 psig and heated to about 230° C. for about one hour, followed by removal from the press and a three hour post-cure at about 230° C. The plates have a lap shear strength value of about $24 \times 10^6$ N/m$^2$.

EXAMPLE X

The experiment of Example IX is repeated with the quantities of BDTA and BTCD varied as follows: X (a) about 80.5 g. (0.25 M) BTDA and about 445.8 g. (2.25 M) BTCD, X (b) about 161 g. (0.50 M) BDTA and about 225.4 g. (1.125 M) BTCD, X (c) 362.4 g. (1.125 M) BDTA and about 99.0 g. (0.5 M) BTCD, and X (d) about 724.8 g. (2.25 M) BDTA and about 49.5 g. (0.25 M) BTCD. In each case a good adhesive results. Best results are obtained with approximately equimolar quantities of BDTA and BTCD. Increasing the proportion of BDTA tends to cause stiffness of the adhesive, while increasing the proportion of BTCD causes lower thermal stability of the final coating.

EXAMPLE XI

Samples of the adhesive of Example IX are prepared up to the first drying step. These samples are used to thoroughly impregnate fabric swatches as follows: XI (a) a tow of high-strength graphite fibers, available from Union Carbide under the "Thornel" trademark are dipped in the resin liquid and placed in a mold, XI (b) five sheets of woven glass fabric cloth are soaked in the resin liquid and stacked in a press mold, XI (c) two sheets of woven Kevlar aramid fiber from DuPont and a sheet of glass fiber mat are soaked in the liquid resin and placed in a mold with the mat between the fabric sheets. In each case solvents are first evaporated by heating the molds to a temperature of about 90° C. for about one hour, then the resin is cured by heating at about 220° C. for about four hours under about 3 psig pressure. In each case a high strength, well consolidated and bonded composite structure results.

Although specific components, proportions and conditions have been specified in the above examples, these may be varied with similar results, where suitable. In addition, other materials may be added to the resin material, such as adhesion promoters, fillers, colorants, ultraviolet absorbers, or the like.

Other applications, modifications and ramifications of the present invention will occur to those skilled in the art upon reading the present disclosure. These are intended to be included with the scope of the invention, as defined in the appended claims.

We claim:

1. A high strength fiber reinforced composite article produced from the method which comprises the steps of:

preparing an adhesive mixture by mixing an aromatic tetracarboxylic acid dianhydride with an oxime in a mole ratio of oxime to tetracarboxylic acid dianhydride between about 0.01:1 and 1:1 to produce an N-substituted aliphatic imide, dissolving said imide in a solvent, adding thereto a diamine and adding to the mixture an aliphatic tetracarboxylic acid dianhydride either before or after the mixture is dissolved in said solvent, said solvent is a reactive solvent esterifying agent;

soaking at least two woven fabric or mat sheets in said adhesive mixture;

drying the soaked sheets of woven fabric or mat sheets at a temperature range of 100° to 150° f. to remove said solvent; and stacking said sheets in a mold and applying a pressure of about 5 to 100 psi at a temperature in the range of 300°–450° f. for 30 to 120 minutes.

2. The article of claim 1 wherein said at least two woven fabric sheets are constructed of glass fibers.

3. The article of claim 1 wherein said at least two woven fabric sheets are constructed graphite fibers.

4. The article of claim 1 wherein said at least two woven fabric sheets are constructed of carbon fibers.

5. The article of claim 1 wherein said at least two woven fabric sheets are constructed from one or more of a class of materials consisting of glass, graphite, carbon or Kevlar fiber.

6. The article of claim 1 wherein the fibers are positioned in a unidirectional relationship.

7. The article of claim 1 wherein the fibers are positioned in a cross-ply relationship.

8. The article of claim 1 wherein the fibers are positioned in a tandom direction.

* * * * *